United States Patent  
Tatasciore et al.

(10) Patent No.: US 10,711,464 B1
(45) Date of Patent: *Jul. 14, 2020

(54) WATER DIVERTING AND FILTERING DEVICE FOR RAIN GUTTERS

(71) Applicants: Christopher G. Tatasciore, Loomis, CA (US); Slate E. Bryer, Loomis, CA (US)

(72) Inventors: Christopher G. Tatasciore, Loomis, CA (US); Slate E. Bryer, Loomis, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/459,312

(22) Filed: Jul. 1, 2019

Related U.S. Application Data

(63) Continuation-in-part of application No. 16/353,749, filed on Mar. 14, 2019.

(60) Provisional application No. 62/642,715, filed on Mar. 14, 2018.

(51) Int. Cl.
*E04D 13/068* (2006.01)
*B01D 39/10* (2006.01)
*C02F 1/00* (2006.01)
*C02F 103/00* (2006.01)

(52) U.S. Cl.
CPC ........... *E04D 13/068* (2013.01); *B01D 39/10* (2013.01); *C02F 1/001* (2013.01); *B01D 2239/1216* (2013.01); *C02F 2103/001* (2013.01)

(58) Field of Classification Search
CPC .............. E04D 13/068; E04D 13/0767; E04D 2013/0413
See application file for complete search history.

(56) References Cited

U.S. PATENT DOCUMENTS

| | | | | |
|---|---|---|---|---|
| 2,583,422 A * | 1/1952 | Haddon | ................ | E04D 13/076 210/498 |
| 4,959,932 A * | 10/1990 | Pfeifer | ................ | E04D 13/076 52/12 |
| 5,010,696 A * | 4/1991 | Knittel | ................ | E04D 13/076 210/474 |
| 5,109,640 A * | 5/1992 | Creson | ................ | E04D 13/076 210/474 |
| 5,729,931 A * | 3/1998 | Wade | ................ | E04D 13/076 248/48.2 |
| 7,913,458 B2 | 3/2011 | Higginbotham | | |

(Continued)

OTHER PUBLICATIONS

Arrow Gutter Guards Invoice Dated Mar. 31, 2016 and photograph of Diamond Gutter Guard attached to a gutter.

*Primary Examiner* — Paola Agudelo
(74) *Attorney, Agent, or Firm* — John P. Costello; Costello Law Corp.

(57) ABSTRACT

A gutter guard system for keeping leaves and other debris out of a roof gutter while allowing water to pass into the gutter having a wire mesh filtration screen employing horizontal rows of individual elevated shapes, elevated ridges and connected elevated shapes that are staggered relative to adjacent horizontal rows. The horizontal rows employ individual elevated shapes, elevated ridges and connected elevated shapes with leading edges which are configured with high points graduating to low points to aid in diverting water from its normal path being perpendicular to the gutter. The leading edge slows the water down and creates a siphoning effect of water diverting into the gutter.

19 Claims, 16 Drawing Sheets

(56) References Cited

U.S. PATENT DOCUMENTS

| | | | |
|---|---|---|---|
| 8,375,644 B2* | 2/2013 | Robins | E04D 13/076 52/12 |
| 9,021,747 B2 | 5/2015 | Lenney | |
| 9,284,735 B2 | 3/2016 | Bryer | |
| 10,125,496 B2* | 11/2018 | Lenney | E04D 13/076 |
| 2007/0234647 A1* | 10/2007 | Higginbotham | E04D 13/076 52/12 |
| 2011/0138698 A1* | 6/2011 | Neumann | E04D 13/076 52/12 |
| 2011/0283630 A1* | 11/2011 | Beckham | E04D 13/0725 52/12 |
| 2012/0144759 A1* | 6/2012 | Higginbotham | B01D 69/10 52/12 |
| 2017/0022714 A1* | 1/2017 | Bryer | E04D 13/076 |

* cited by examiner

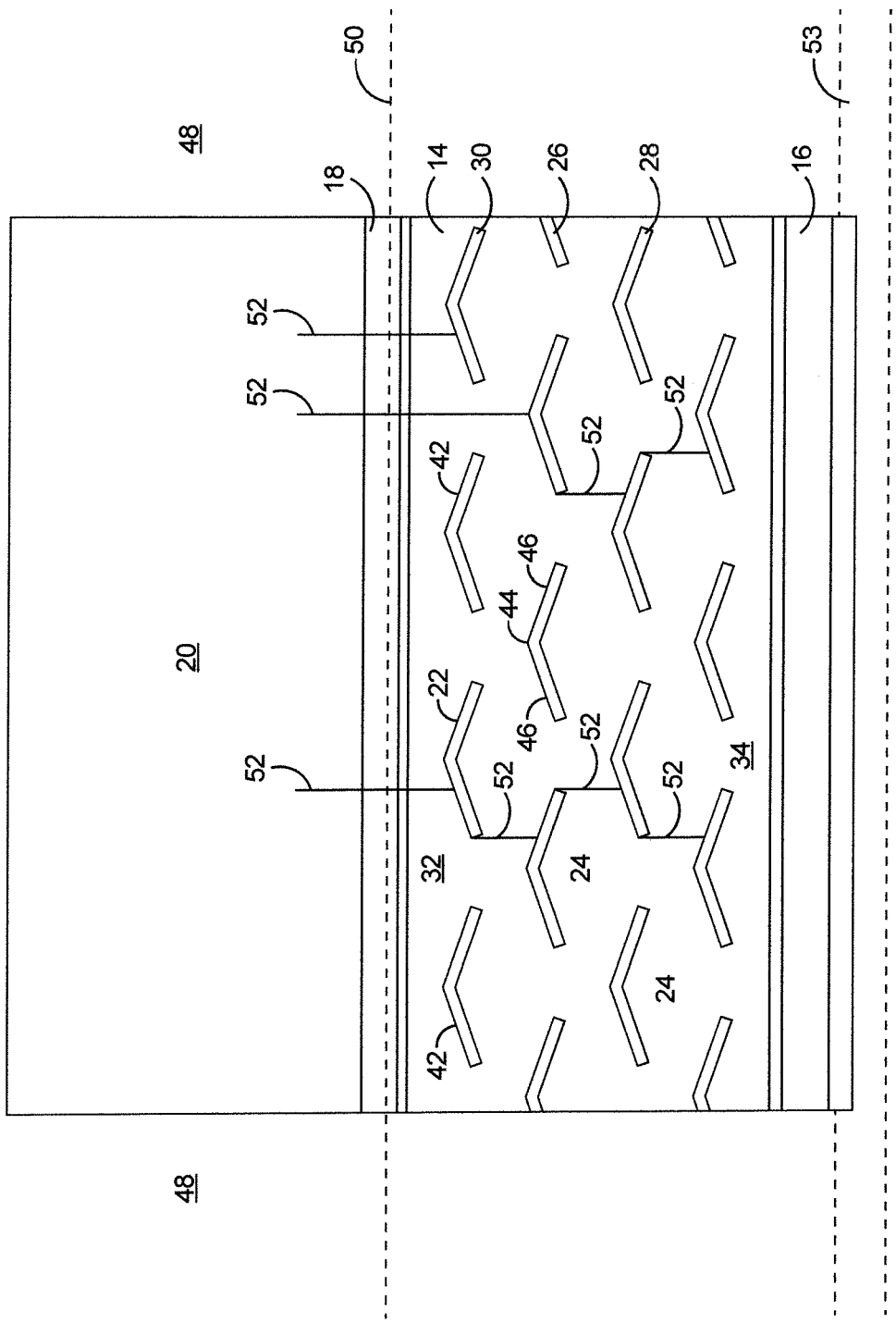

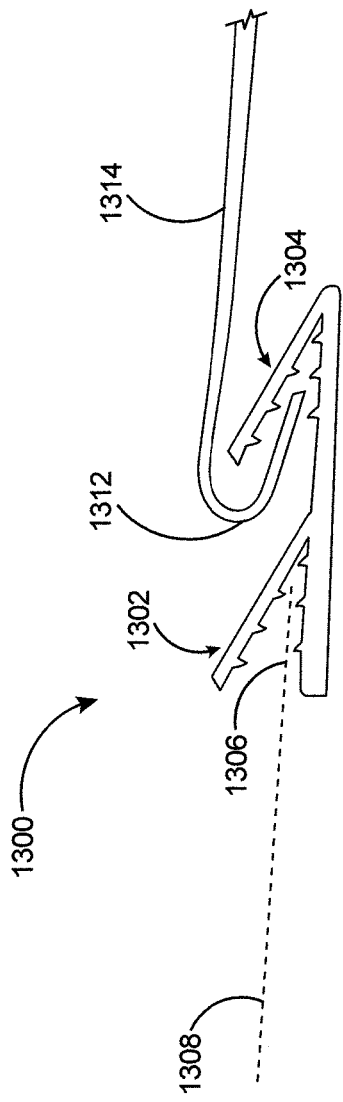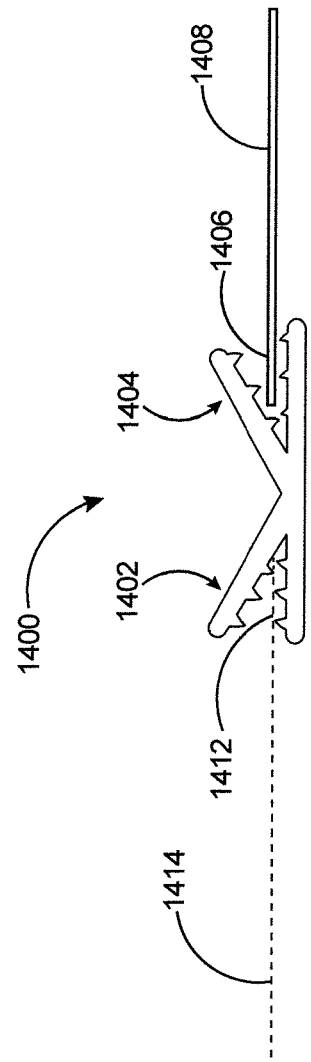

WATER DIVERTING AND FILTERING DEVICE FOR RAIN GUTTERS

CROSS-REFERENCE TO RELATED APPLICATIONS

This application is a continuation-in-part of U.S. patent application Ser. No. 16/353,749, filed Mar. 14, 2019, which claims the benefit of U.S. Provisional Patent Application No. 62/642,715, filed on Mar. 14, 2018.

BACKGROUND OF THE DISCLOSURE

Technical Field of the Disclosure

This invention relates to gutter guard products which employ a wire mesh filtration screen, and more particularly, relates to a frameless gutter guard having patterns formed into the wire mesh screen itself which serve to slow down and divert water contacting the wire mesh filtration screen.

Description of the Related Art

U.S. Pat. No. 9,021,747 issued to Lenney ("'747 Patent") describes a gutter guard system which has a corrugated wire mesh filtration screen. The filtration screen is embossed with corrugations which extend from the upper edge to the lower edge of the screen. The '747 Patent has the corrugated upper edge and lower edge of the screen fitting into recesses of upper and lower supports and being crimped therein. However, while a corrugated wire mesh filtration screen with corrugations oriented perpendicular to the long axis of the gutter as described in the '747 Patent is good for imparting strength to the gutter guard system, it does very little to slow down the flow of water traveling over the screen. To slow water flow the '747 Patent teaches applying beads of caulk beneath the screen the beads being oriented perpendicular to the direction of water flow. However, the screen alone does nothing to slow or divert water based on the teachings of the '747 Patent.

U.S. Pat. No. 7,913,458 issued to Higginbotham ("'458 Patent") teaches placing V-troughs oriented perpendicular to the direction of water flow across a screen to divert water.

The inventors, in their U.S. Pat. No. 9,284,735 introduced the concept of using a wire mesh filtration screen with ridges running between upper and lower edges of the screen, the ridges being sinusoidal or S-shaped. These S-shaped ridges served to slow down the flow of water and divert it into the glitter very early in its travel across the screen. The screen is supported by louvres which are part of an underlying support.

The Diamond Gutter Guard manufactured by Artesian Home Products of Loomis, California is a "frameless" gutter guard, that is, the mesh filtration screen has no underlying support. A plurality of diamond shapes is embossed into the mesh filtration screen and distributed vertically between the top and bottom frame supports to which the screen is attached. The vertically arranged diamond shapes are joined by connecting vertical ridges.

The inventors believe that screen patterns having designs directed toward breaking up water flow as it travels across the screen has significant merit. The present invention seeks to do just this as one of its objectives.

Furthermore, environmental factors such as heat, cold, ice and heavy impacts from tree branches, have, in time, caused wire mesh filtration screens to pull, free of gutter guard support structures. The inventors believe the prior art method and means of crimping the wire mesh filtration screen into the gutter guard support structures is inadequate. In addition, prior art crimping systems create a pocket where the crimping system of the support structure contacts the upper and lower edges of the wire mesh filtration screen. As debris flows off of a roof during a rainstorm, it is carried down the screen until it encounters the junction of the lower frame crimping upon the lower screen edge. The pockets located at this junction fill up with debris particles over time and can cover the screen, as buildup becomes greater. The inventors believe a need exists for a crimping system which thwarts or eliminates these debris pockets.

For years, gutter guards have employed an upper wing which is placed beneath a first course of roof shingles as one means of connecting the gutter guard to the roof and gutter. This type of connection is not problem free because gutters are not connected to building eaves at a uniform height. Furthermore, the additional variable of different roofs having different roof pitches interjects another factor which ensures that a gutter guard will not be optimally positioned upon a gutter. These variables cause the upper wing to strain against the gutter front lip connection to a gutter guard, often causing the first course of shingles to lift up. Additionally, the gutter guard support structure might have to be positioned on the gutter front lip at an extreme angle, causing the rear of the support structure to lift off of the gutter. A need therefore exists for a gutter guard having an upper wing connection and an upper wing that allows the gutter guard to accommodate different eave positionings of a gutter and also different roof pitches. The present invention overcomes the prior art shortcomings and accomplishes these and other critical objectives.

SUMMARY OF THE DISCLOSURE

The inventions described herein are directed toward improving gutter guards in general. In one aspect of the invention, the use of mesh filtration screen patterns having designs directed toward breaking up water flow is achieved by three main screen pattern types. The first type is comprised of a plurality of individual elevated shapes embossed into the screen horizontally between the left and right sides of the screen, the shapes being elevated above the flat portions of the screen, thus creating obstacles for the water to run into. These elevated shapes are preferably arranged into horizontal rows, wherein the elevated shapes of each row are staggered relative to the elevated shapes occurring in adjacent horizontal rows located above and below any one particular horizontal row. The second type of water-diverting screen pattern in accordance with the invention comprises rows of horizontal continuous elevated ridge patterns. These ridge patterns run horizontally between the left and right sides of the wire mesh filtration screen. Each individual row of continuous elevated ridge is staggered relative to the row above or below it such that high and low points of adjacent ridges do not align. Still a third type of water-diverting screen pattern comprises rows of elevated connected horizontal shapes, wherein the shapes of each row are staggered relative to the rows of elevated connected horizontal shapes occurring above and below any one particular horizontal row.

Furthermore, the invention is also a set of receivers for receiving the upper and lower mesh filtration screen edges and crimping them in such a way that the screen edges are held fast in the receivers while minimizing the potential for debris pockets forming at the junction where the screen meets the receivers.

The invention also describes a frameless gutter guard, that is a gutter guard having a front plane connection and a rear plane connection, the mesh filtration screen having no underlying support and instead relying on its own screen stiffness to maintain the strength and integrity of the gutter guard system. The front and rear plane connections are attached to the mesh filtration screen at its lower and upper screen edges, respectively. The front and rear plane connections have receivers for receiving the lower and upper edges of the mesh filtration screen and crimping the screen edges. Furthermore, the connection of the upper wing to the rear plane connection of this invention allows for bending of the upper wing so that a precise fit of the gutter guard system to any gutter, regardless of eave placement of a gutter or the variability of roof pitch.

BRIEF DESCRIPTION OF THE DRAWINGS

FIG. 3 is a plan view of the embodiment of FIG. 1 showing how the inventive gutter guard system and its mesh filtration screen would perform in a rainstorm.

FIG. 13 is a closeup right end view focusing on the rear plane connection of the inventive gutter guard; this embodiment of the gutter guard having a rear plane connection comprised of two receivers facing the same direction. A first receiver receives the upper edge of the wire mesh filtration screen to crimp it therein. A second receiver is adapted to receive the attachment portion of the upper wing.

FIG. 14 is a closeup right end view focusing on the rear plane connection of the inventive gutter guard, this embodiment of the gutter guard having a rear plane connection comprised of two receivers facing opposite directions. In contrast to the rear plane connection of FIG. 13, this embodiment has a first receiver for receiving the upper edge of the wire mesh filtration screen and a second receiver facing the opposite direction for receiving an attachment portion having a straight front edge for crimping in the second receiver.

DETAILED DESCRIPTION OF THE DRAWINGS

Figure 1:
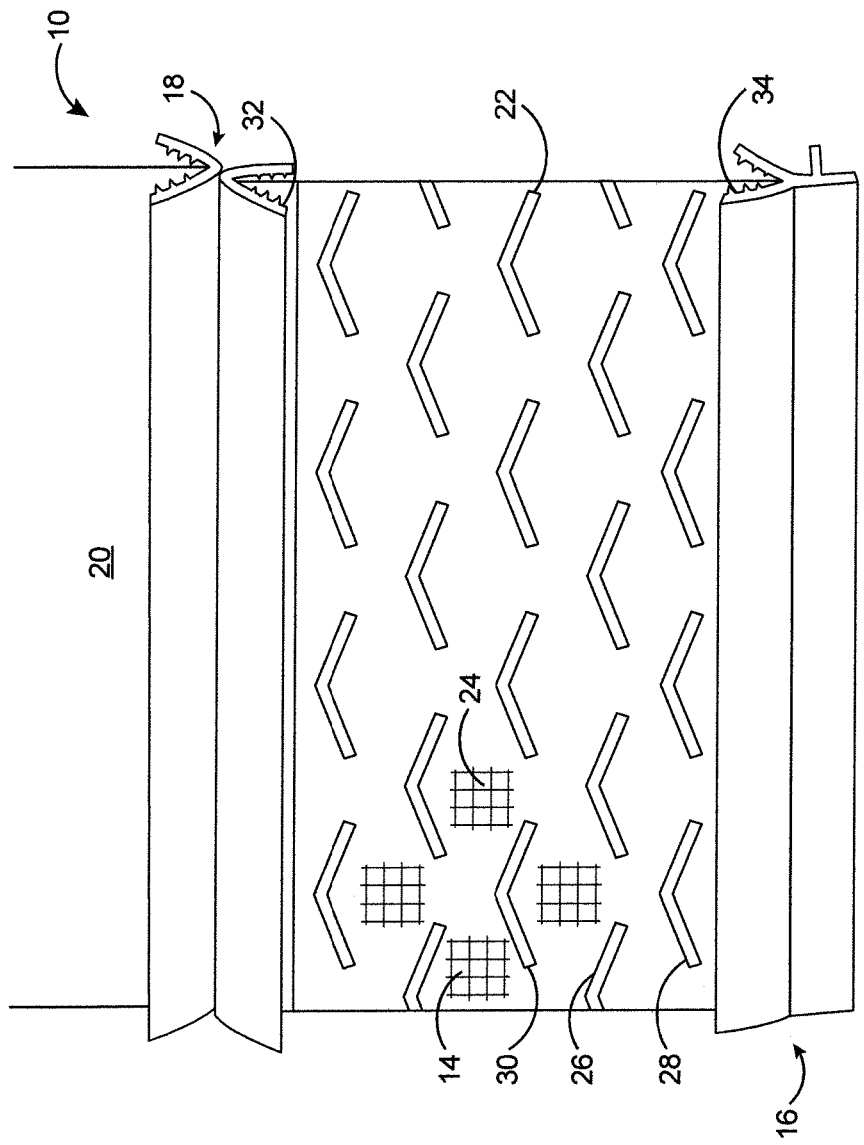
FIG. 1 is an elevated perspective view of a representative first embodiment of the inventive gutter guard system that is the subject of this disclosure, the first embodiment being comprised of a wire mesh filtration screen having a plurality of individual chevron shapes arranged in horizontal rows extending between the left and rights sides of the wire mesh filtration screen where each row is staggered in relation to adjacent rows above and below.

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized, and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

As used herein, the singular forms "a", "an" and "the" include plural referents unless the context clearly dictates otherwise. "And" as used herein is interchangeably used with "or" unless expressly stated otherwise. As used herein, the term 'about" means+/−5% of the recited parameter. All embodiments of any aspect of the invention can be used in combination, unless the context clearly dictates otherwise.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "wherein", "whereas", "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

The prior art teaches that water will run off of a mesh filtration screen and land on the ground unless the screen is engineered with a water-diverting feature, to divert water from the top of the screen to beneath the screen and into the gutter upon which a gutter guard system is placed. One exemplary diversion method involves placing a bead of caulk beneath the screen, the bead being oriented perpendicular to the flow of rainwater.

The inventor's own U.S. Pat. No. 9,284,735 describes a continuous sinusoidal ridge that runs between the top and bottom edges of the mesh filtration screen and acts to divert water along its length. When water contacts the sinusoidal ridge, it slows down and is siphoned beneath the screen.

Other prior art gutter guard products have relied on a downward V-bend or trough imparted in the mesh filtration screen oriented perpendicular to water flow as an engineered way to divert water into a gutter.

The present invention proposes water-diverting mesh filtration screen patterns which do not rely on a continuous ridge running between the top and bottom edges of a mesh filtration screen and do not rely on the other solutions for water diversion described above. Rather, the present invention proposes using horizontal rows of elevated patterns to divert water, wherein in all instances any one particular row is staggered in relation to the adjacent rows above and below it. The present invention divides these water-diverting patterns into three basic types.

The first type is comprised of a plurality of shapes embossed into the screen which are elevated above the flat portions of the screen, thus creating obstacles for the water to run into. These elevated shapes are preferably arranged into horizontal rows extending between the left and right sides of the mesh filtration screen, wherein the elevated shapes of each row are staggered relative to the elevated shapes adjacently arranged above or below any one horizontal row. The staggered relationship between horizontal rows ensures that when water falls from the lowest point along the leading edge of an elevated shape that it will fall upon a higher point along the leading edge of an elevated shape located in the row below it. Another characteristic of the individual elevated shapes is that they have at least one high point along a water-contacting leading edge that continues to lower points, thus ensuring that water will flow downward, by gravity, along the leading edge of each elevated shape. The elevated shapes of each pattern are elevated a small degree above the flat portions of the wire mesh filtration screen. In the preferred embodiment of the mesh filtration screen, the elevated shapes rise ⅛" or less above the flat screen portion of the wire mesh filtration screen. This height is sufficient to present a water-diverting obstacle to any water flowing across the mesh filtration screen. When water contacts the leading, water-facing edge of the elevated shape, water is diverted left, right, or both left and right, depending on the point of contact along the leading edge of the elevated shape where the water touches. Often in heavy downpours, rainwater sheets off of a roof onto the inventive gutter guard system and upon contacting the elevated shapes, the water sheet is broken up, slowed down and diverted (left, right or both left and right) through the screen and into the gutter.

The second type of water-diverting screen pattern in accordance with the invention comprises rows of horizontal continuous elevated ridges. These ridge patterns run between the left and right sides of the wire mesh filtration screen. Each individual horizontal row of continuous elevated ridge is staggered in relation to adjacent rows above or below it such that high and low points of adjacent ridges do not align. Each continuous row has high points and low points, wherein when water flows off of a roof and contacts a high point the water will then flow left, right or both left and right, thus breaking up and diverting the water flow across the wire mesh filtration screen. At the lowest point of the horizontal row, a focal point is formed where any water that has not been diverted into the gutter collects and is diverted through the filter media or up and over the elevated ridge portion at the focal point to flow further on the flat portions of the filtration screen until it hits the adjacent elevated ridge located beneath it. The staggered relationship between horizontal rows ensures that when water flows from the focal point of a higher elevated ridge that it will hit along a higher point of the leading edge on the elevated ridge below it. The water then continues to be diverted and dissipates further upon contacting each successive ridge.

The third type of water-diverting screen pattern in accordance with the invention comprises an elevated ridge pattern of connected shapes which run between the left and right sides of the wire mesh filtration screen. The connected shapes could be connected ovals, or connected diamond shapes, for example. The connected shapes are connected to form an elevated ridge and adjacent horizontal ridges are staggered such that the high and low points of adjacent ridges do not align. Each elevated ridge pattern presents a water-facing leading edge toward the flow of water coming from a roof. When water contacts the first ridge nearest the upper edge of the screen it is slowed down and is diverted left, right or left and right, depending on where the water contacts the first elevated ridge, the water being siphoned beneath the screen into a gutter. Water travels along the leading edge from high points to low points. At the lowest point, a focal point is formed where any water that has not been diverted to the gutter collects and is diverted through the filter media or up and over the narrow focal point to flow and hit the elevated ridge of connected shapes located beneath it. The staggered relationship between horizontal rows ensures that when water flows from the focal point of a higher elevated ridge that it will hit along a higher point of the leading edge on the elevated ridge below it. The water then continues to be diverted and dissipate further upon contacting each successive ridge.

The invention also describes a rear plane connection and a front plane connection for the mesh filtration screen which have receivers for receiving the upper and lower edges of the mesh filtration screen respectively and crimping the screen edges. The receivers can also be adapted for receiving an upper wing for inserting beneath roof shingles to hold the gutter guard system in place.

Referring now to FIG. 1, the inventive gutter guard system 10 is a frameless system wherein the filter media 14 is self-supporting and provides structural support for the rest of the gutter guard system 10. The system shown has the filter media 14 connected at its upper edge 32 to rear plane connection 18 and connected at its lower edge 34 to front plane connection 16. The filter media 14 is preferably a wire mesh filtration screen which has a sufficient level of stiffness to be self-supporting. It has been found that a wire mesh filtration screen of a 30-mesh size with an engineered diameter in a range of 0.011 to 0.016 inches provides a sufficient level of stiffness for filter media 14. Additionally, embossing the various individual elevated shapes and elevated ridge patterns as herein described adds a further measure of stiffness to the screen. The front plane connection 16 generally rests upon the front edge of a gutter to which the gutter guard system 10 is attached. The rear plane connection 18 preferably attaches an upper wing 20 which inserts beneath the first course of shingles on a roof. The mesh filtration screen 14 in the embodiment shown in FIG. 1 incorporates a plurality of individual shapes 22 embossed into it which are elevated above the flat portions 24 of the mesh filtration screen 14, thus creating obstacles for water to run into as water runs from the rear plane connection 18 to front plane connection 16. In this embodiment, the elevated shapes 22 are chevron shaped. These elevated shapes 22 are arranged into staggered horizontal rows 26, wherein the elevated shapes 22 of each horizontal row 26 are staggered relative to the elevated shapes 22 occurring in the horizontal rows located above 30 and below 28 of horizontal row 26. The wire mesh filtration screen 14 has an upper edge 32 and a lower edge 34. The upper edge 32 of the wire mesh filtration screen 14 is located adjacent a roof to which the inventive gutter guard system 10 is attached and receives the highest initial flow of rainwater from the roof.

Figure 2:
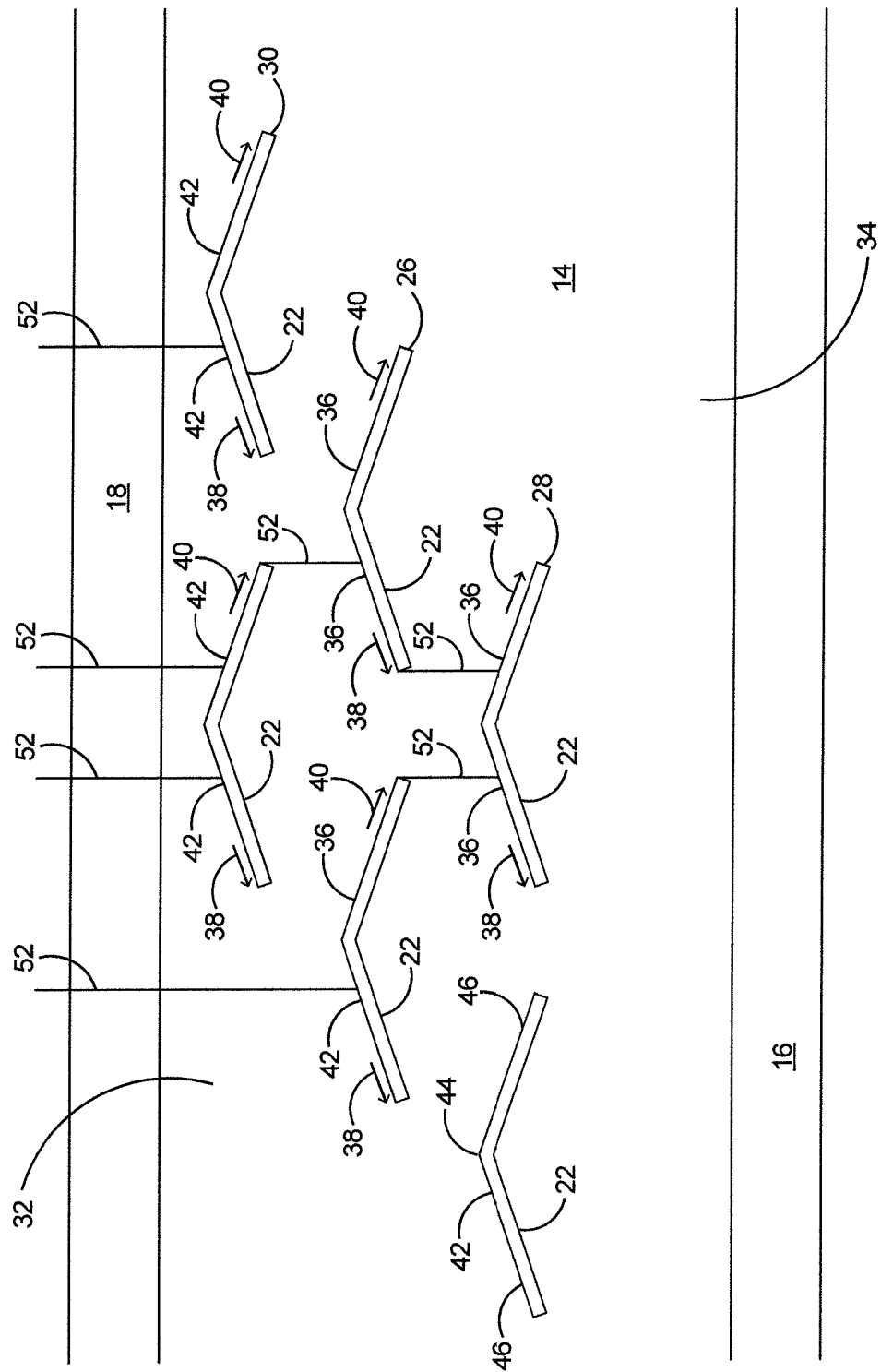
FIG. 2 is a closeup section of the filter media portion of the embodiment of FIG. 1, shown coupled to the front plane connection and rear plane connection. This view shows the operation of the individual elevated chevron shapes operating against a flow of water from a roof, as would happen in a rainstorm.

Referring now to FIG. 2, a closeup section of the wire mesh filtration screen 14 of the embodiment of FIG. 1 is shown coupled to the front plane connection 16 and rear plane connection 18. As water flows downward (lines 52) from the upper edge 32 toward the lower edge 34 of wire mesh filtration screen 14 it encounters the staggered horizontal rows 26, 28, 30 of elevated shapes 22, which slow the water and dissipates the water's energy by diverting the flow of water left 38, right 40, or both left and right 38, 40. Each elevated shape has a leading edge 42 comprised of at least one high point 44 which declines into lower points 46, the water traveling by gravity from the higher points 44 along the leading edge 42 to the lower points 46. During the line of travel along the leading edge of elevated shapes 22, water is siphoned beneath the filter media 14 due to the force created by high velocity water following behind slower water that has contacted the leading edge 42 of each elevated shape 22. The inventive gutter guard system thus ensures a high rate of water entering the gutter as a result of this siphoning action.

The staggered horizontal rows of elevated shapes act to slow down and divert water as it flows by gravity off of a roof and onto the wire mesh filtration screen. In FIG. 3 a plan view of the inventive gutter guard system and its mesh filtration screen is shown as it would perform in a heavy rainstorm, for example. Water flows off of a roof 48 (roofline indicated by dotted line 50) and into a gutter to which the device is attached. This initial flow of water from the roof 48 (water flow indicated by lines 52) contacting row 30 closest to the upper edge 32 being the heaviest of all. Each row of elevated shapes is arranged in opposition to the water flow 52. A good portion of this initial flow contacting horizontal row 30 is diverted and siphoned into the gutter (front lip of gutter indicated by dotted lines 53), as the water flow 52 contacts the leading edges 42 of the elevated shapes. The leading edges 42 each have a high point 44 and low points 46 which diverge away from high point 44. The water that contacts along leading edge 42 is slowed down and then contacted by higher velocity water behind the slower water contacting the leading edge 42. This convergence of high velocity water against low velocity water creates a siphoning effect along leading edge 42, which diverts the majority of the flow 52 beneath the screen and into the gutter. Due to this diversion, the next horizontal row 26 encounters a dissipated flow of water, which is comprised of remaining water flowing off of the leading edges 42 of row 30 and any flat sections 24 of filter media 14, which exist between the elevated shapes 22 of row 30. Row 26 therefore receives a greatly dissipated flow of water compared to row 30. This water diversion will continue with each row, the flow dissipating further upon contacting the leading edges of the elevated shapes of each successive row.

Figure 4A:
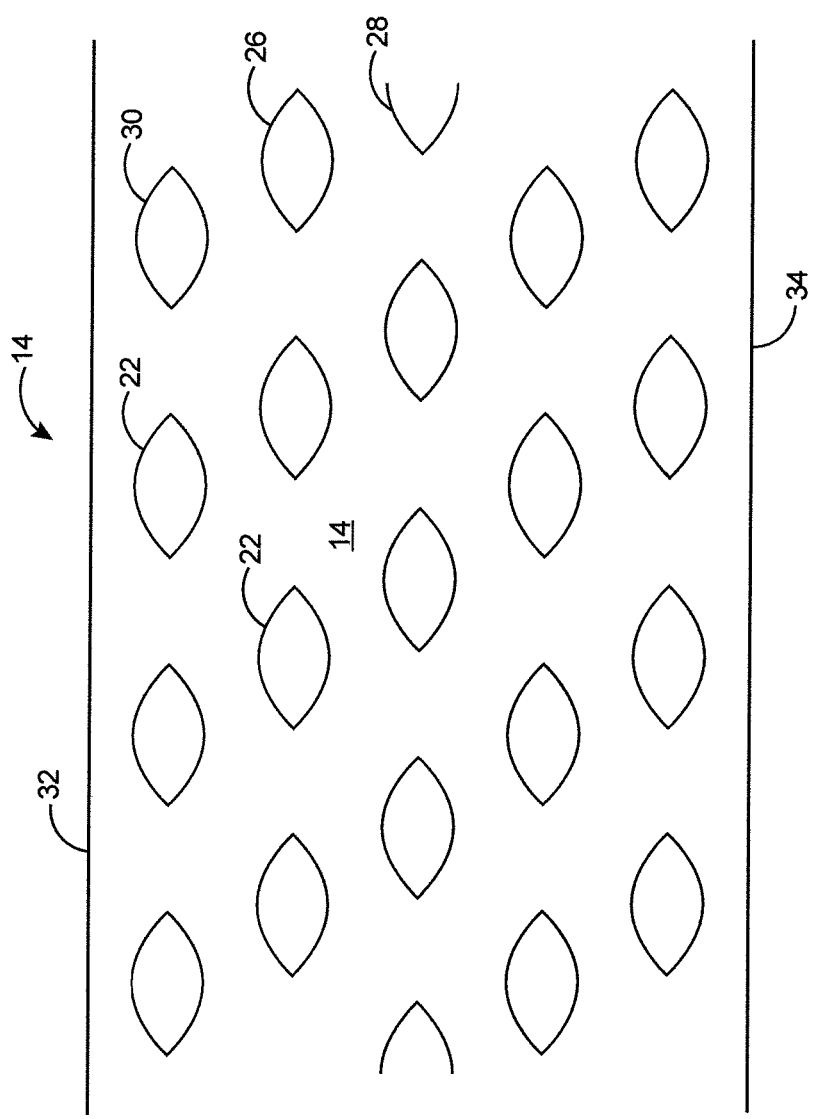
FIG. 4A is a plan view of a possible alternative first embodiment wherein the individual shapes of the wire mesh filtration screen are lemon-shapes.
Figure 4B:
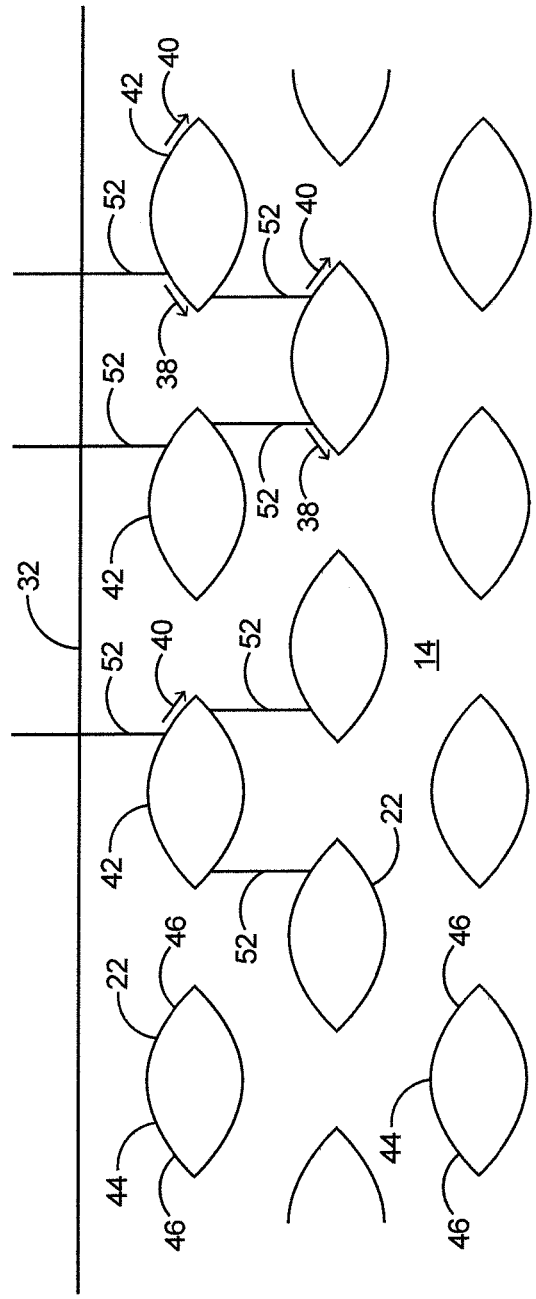
FIG. 4B is a closeup plan view of a section of wire mesh filtration screen of the alternative first embodiment introduced in FIG. 4A, shown performing in a rainstorm.

FIGS. 1-3 illustrated individual elevated chevron shapes and their performance when integrated into a wire mesh filtration screen. Other examples of individual elevated shapes which function in a similar fashion are further described herein. For example. FIG. 4A illustrates a plan view of possible rows 26 of staggered elevated shapes 22 for a mesh filtration screen 14 in accordance with the invention 10. These individual elevated shapes 22 are not connected and are lemon shaped. They are organized into staggered horizontal rows 26, 28, 30 of individual elevated shapes. These elevated shapes 22 are staggered and arranged into horizontal rows, wherein the elevated shapes 22 of each row are staggered, that is they do not align with the elevated shapes 22 occurring in the horizontal rows located above 30 and below 28 an individual row 26 as shown. Referring also to FIG. 4B, the mesh filtration screen 14 has an upper edge 32 and a lower edge 34 (not shown in this view). As water flows from the upper edge 32 toward the lower edge 34 it encounters the plurality of individual elevated shapes 22, which slow the water and dissipate the water's energy by diverting the water flow 52 left 38, right 40, or both left and right. Each elevated shape 22 has a leading edge 42 comprised of at least one high point 44 which declines into lower points 46, the water traveling by gravity from the higher points 44 along the leading edge 42 to the lower points 46. During the line of travel along the edge of elevated shapes, water is siphoned beneath the screen 14 due to the force created by high velocity water following behind slower water that has contacted the leading edge 42 of each elevated shape.

Figure 5:
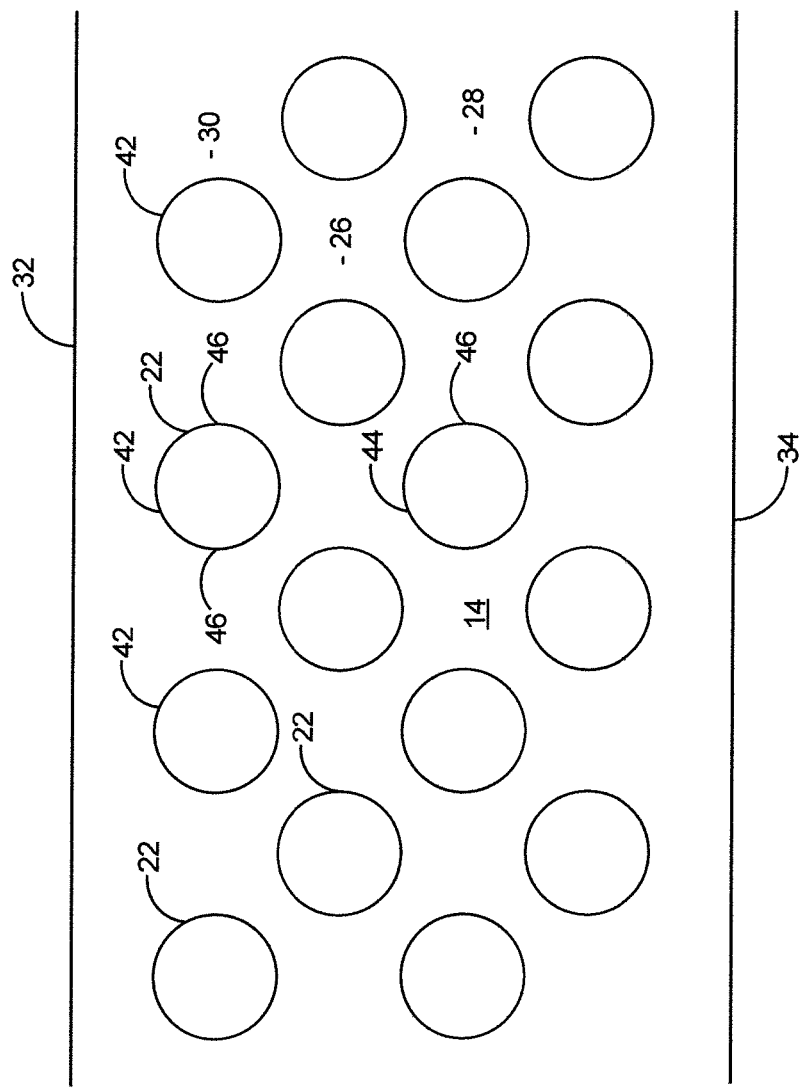
FIG. 5 is a plan view of a possible alternative first embodiment wherein the individual shapes of the wire mesh filtration screen are round shapes.

FIG. 5 illustrates a plan view of a filtration screen 14 of the first embodiment gutter guard system showing other possible staggered individual elevated shapes 22 organized into staggered horizontal rows 26, 28, 30 on a wire mesh filtration screen 14 of the invention. These elevated shapes 22 are round, and each elevated shape has a leading edge 42 comprised of at least one high point 44 which declines into lower points 46.

Figure 6:
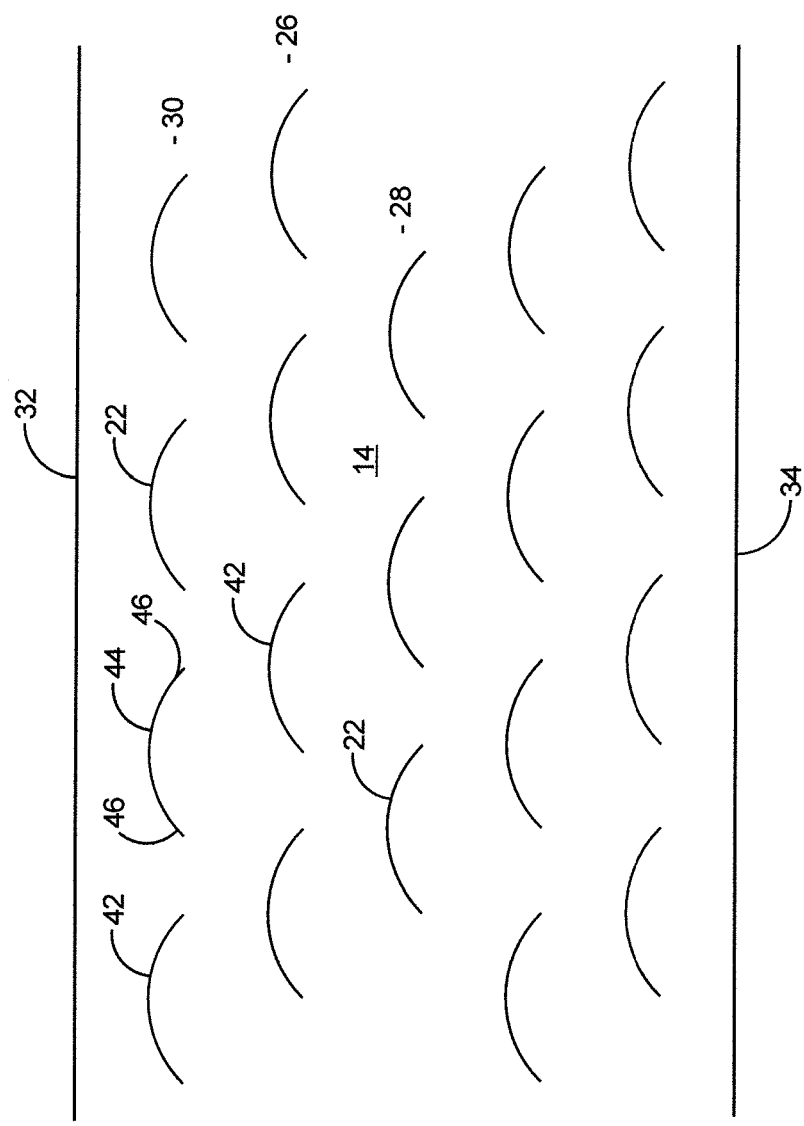
FIG. 6 is a plan view of a possible alternative first embodiment wherein the individual shapes of the wire mesh filtration screen are crescent shapes.

FIG. 6 illustrates a plan view of a filtration screen 14 of the first embodiment showing other possible staggered individual elevated shapes 22 organized into staggered horizontal rows 26, 28, 30 on a wire mesh filtration screen 14 of the invention. These elevated shapes 22 are crescent-shaped, and each elevated shape has a leading edge 42 comprised of at least one high point 44 which declines into lower points 46.

Figure 7A:
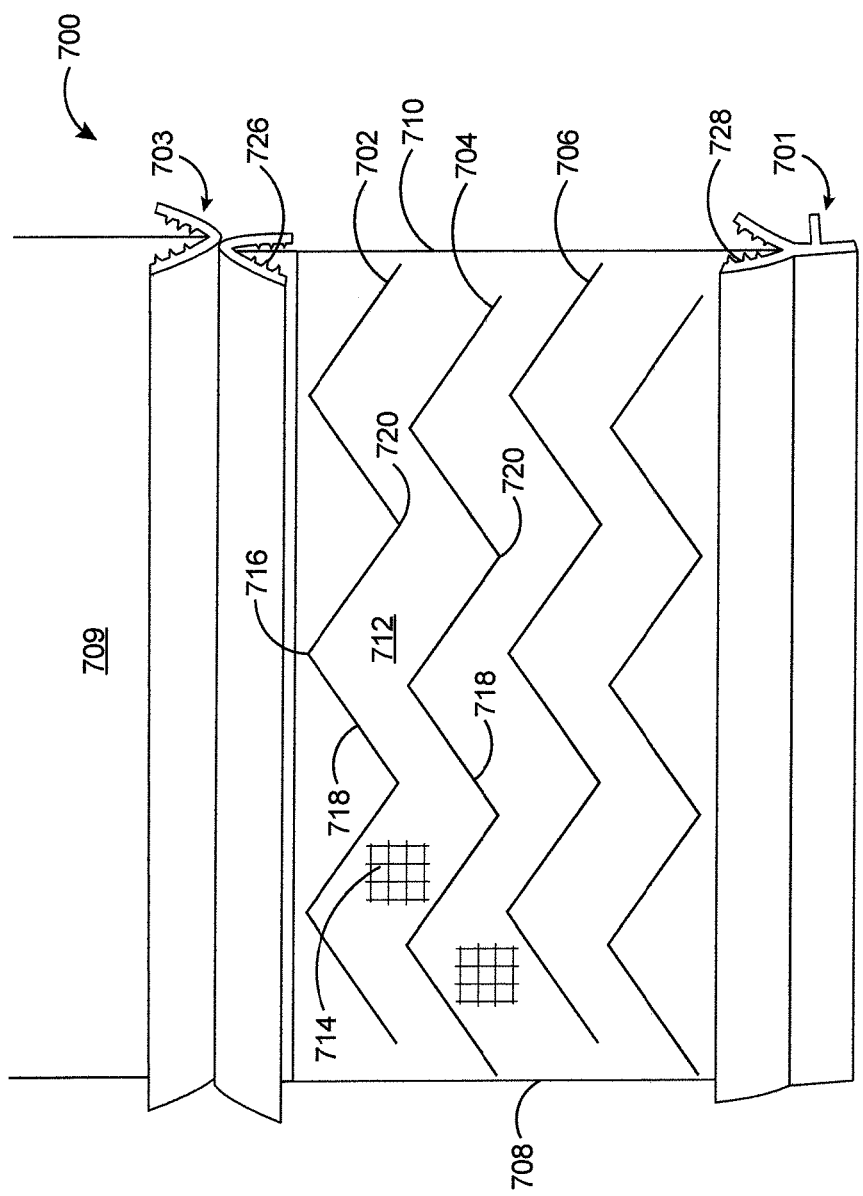
FIG. 7A is a plan view of a second embodiment of the gutter guard system in accordance with the invention, which employs a plurality of elevated ridge patterns which run horizontally between the left and right sides of the wire mesh filtration screen where each individual ridge is staggered in relation to adjacent ridges located above and below. This example of the second embodiment ridge pattern is a staggered zig-zag pattern running horizontally between the left and right sides of the wire mesh filtration screen.

FIG. 7A presents a second embodiment 700 of the gutter guard system in accordance with the invention. The front plane connection 701 of front plane connection 707 couples to lower edge 728 of mesh filtration screen 712 and rear plane connection 703 couples to upper edge 726 of the mesh filtration screen 712. Upper wing 709 attaches to rear plane connection 703. In this second embodiment 700 the wire mesh filtration screen 712 employs a plurality of elevated ridges 702, 704, 706 which run horizontally between the left 708 and right 710 sides of the wire mesh filtration screen 712. The ridge pattern shown in FIG. 7 is a staggered horizontal zig-zag pattern running between the left and right sides of the wire mesh filtration screen. Areas 714 between elevated ridges 702, 704 706 remain as flat mesh screen. The elevated ridges can be imparted into the wire mesh filtration screen through die rolling or stamping and are preferably ⅛" in height or less. Each individual continuous elevated ridge 704 is offset in staggered fashion from the adjacent ridge above 702 and below 706 it such that high 716 and low 718 points of adjacent ridges do not align. At the lowest point of the horizontal ridge, a focal point 720 is formed where any water that has not been diverted to the gutter collects and is diverted through the filter media 712 or up and over the elevated ridge at the focal point 720 to flow and hit the adjacent elevated ridge located beneath it.

Figure 7B:
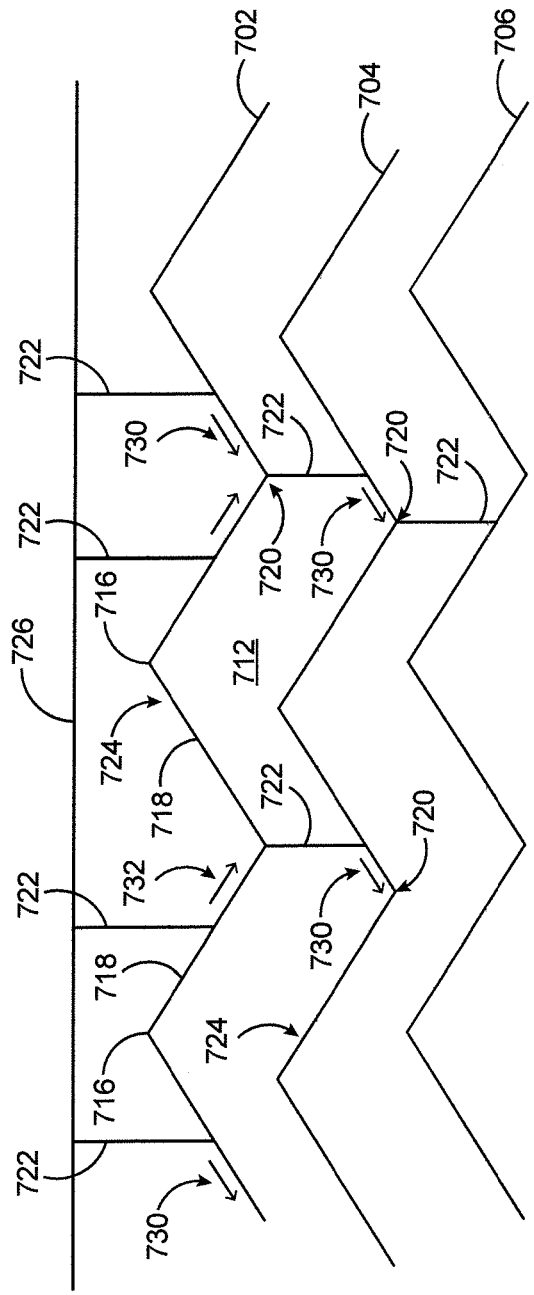
FIG. 7B is a closeup plan view of a section of wire mesh filtration screen of the second embodiment introduced in FIG. 7A, shown performing in a rainstorm.

Referring also to FIG. 7B, a section of the mesh filtration screen 712 from the embodiment 700 of FIG. 7A is shown. The elevated ridges 702, 704, 706 are arranged horizontally between the left 708 and right 710 screen edges and against the flow of water (shown by lines 722) originating from a roof of a structure to which the invention is attached. Each elevated ridge presents a leading edge 724 toward the flow of any water 722 coming off of the roof. When water 722 contacts the first ridge 702 nearest the upper edge 726 of the screen 712 it is slowed down and diverts water left 730, right 732 or left and right, depending on where the water 722 contacts the first elevated ridge 702, the water being siphoned beneath the screen into a gutter. Water 722 travels along the leading edge 724 from high points 716 to low points 718. Successive ridges 704, 706 after the first ridge 702 receive less and less water, until the flow is dissipated and siphoned into the gutter. The elevated ridges 702. 704. 706 are preferably embossed into the wire mesh filtration screen 712 at a height of ⅛" or less.

Figure 8:
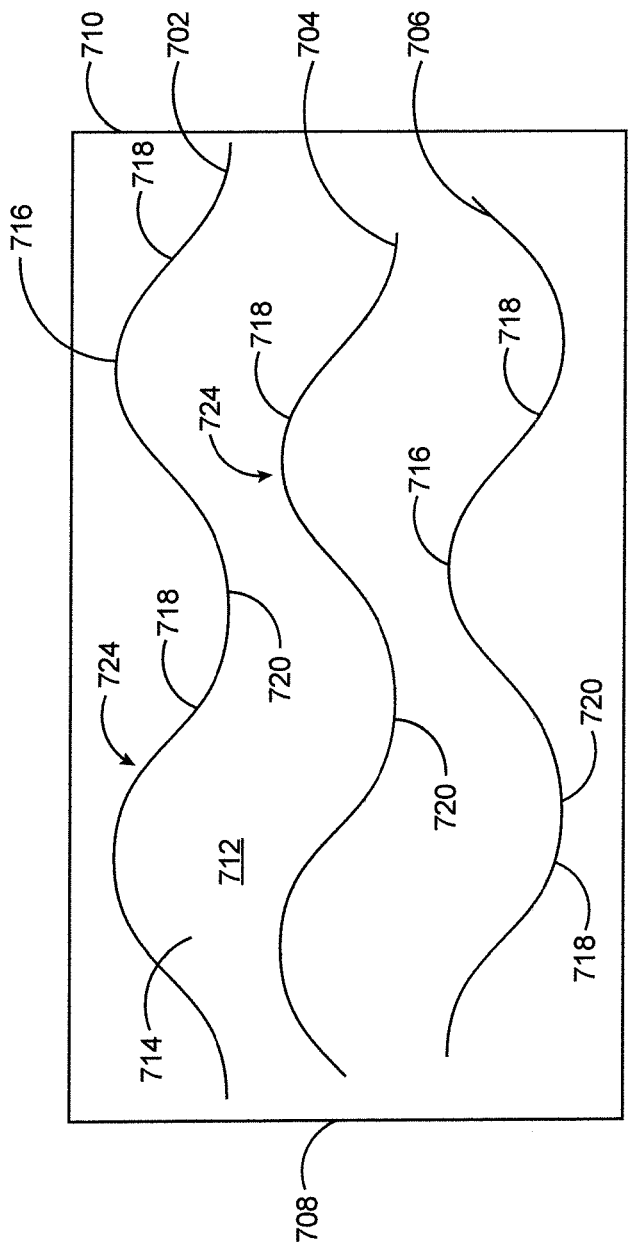
FIG. 8 is a plan view of a possible alternative second embodiment, where elevated ridges are organized into staggered relationship with adjacent elevated ridges. The ridge pattern shown in FIG. 8 is a staggered sinusoidal pattern running horizontally between the left and right sides of the wire mesh filtration screen.

FIG. 8 illustrates a plan view of another possible second embodiment filtration screen 712, where elevated ridges are organized into staggered relationships with adjacent elevated ridges. The ridges 702, 704, 706 shown in FIG. 8 are of a staggered sinusoid pattern running horizontally between the left 708 and right 710 sides of the wire mesh filtration screen 712. Areas 714 between elevated ridges 702, 704, 706 remain as flat mesh screen. The elevated ridges can be imparted into the wire mesh filtration screen 712 through die rolling or stamping. Each individual continuous elevated ridge 704 is offset in staggered fashion from the adjacent ridge above 702 and below 706 such that high 716 and low 718 points of adjacent ridges do not align. At the lowest points along each horizontal ridge, a focal point 720 is formed where any water that has not been diverted to the gutter collects and is diverted through the filter media 712 or up and over the elevated ridge portion at the focal point 720 to flow and hit the adjacent elevated ridge located beneath it. The elevated ridges are arranged horizontally on the mesh filtration screen 712 and against the flow of water originating from the roof of a structure. Water travels along the leading edge 724 from high points 716 to low points 718. Successive ridges 704, 706 after the first ridge 702 receive less and less water, until the flow is dissipated and siphoned into the gutter.

Figure 9A:
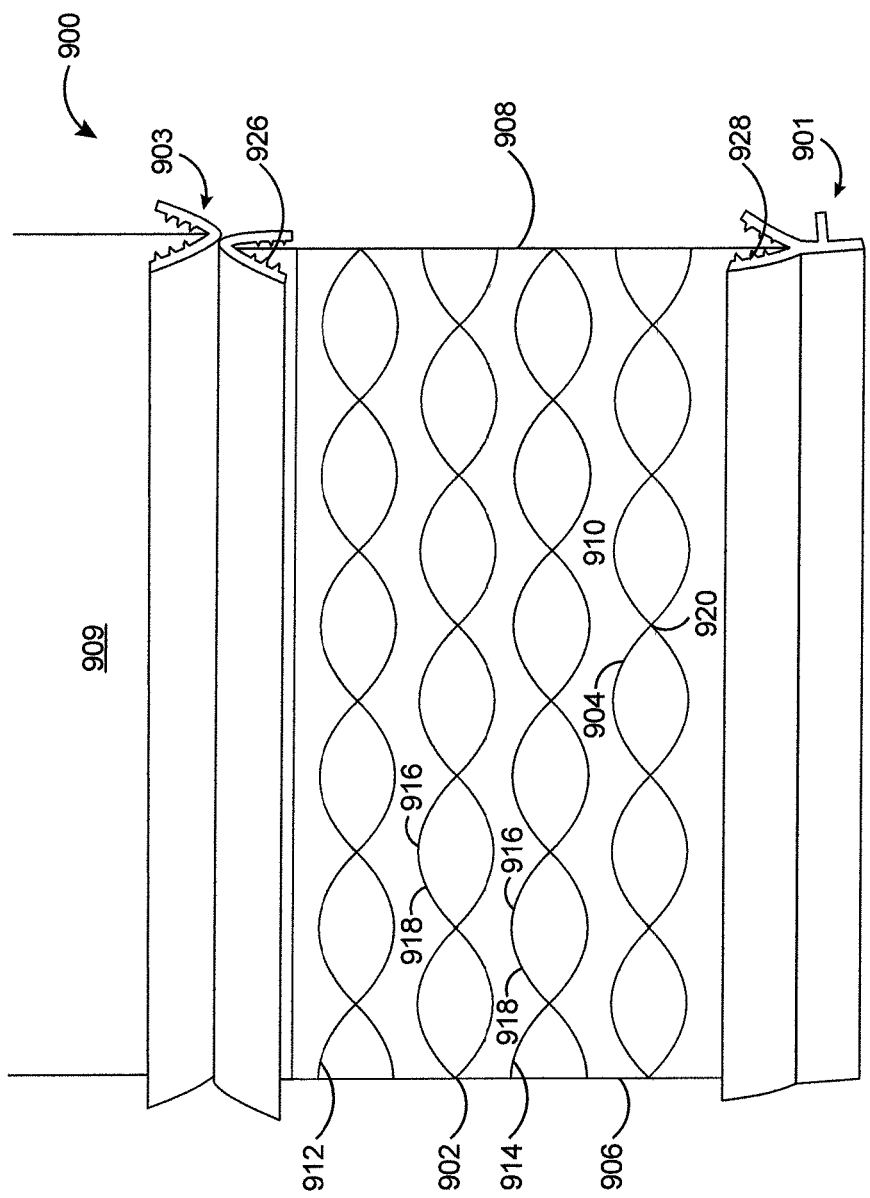
FIG. 9A is a plan view of a third embodiment of the gutter guard system in accordance with the invention, which employs a plurality of elevated ridge patterns which run horizontally between the left and right sides of the wire mesh filtration screen where each individual ridge is comprised of connected shapes staggered in relation to adjacent ridges located above and below. In this embodiment, the elevated ridge pattern is comprised of connected oval shapes.

FIG. 9A presents a further third embodiment of the gutter guard system 900 in accordance with the invention. The front plane connection 901 couples to lower edge 928 of mesh filtration screen 910 and rear plane connection 903 couples to upper edge 926 of the mesh filtration screen 910. Upper wing 909 attaches to rear plane connection 903. This embodiment employs elevated horizontal ridges 912, 902, 914 comprised of connected shapes 904 which run between the left 906 and right 908 sides of the wire mesh filtration screen 910. In this embodiment, the elevated ridges 912, 902,914 are comprised of connected oval shapes 904. The connected shapes 904 form an elevated ridge 902 and adjacent horizontal ridges above 912 and below 914 are staggered such that the high 916 and low 918 points of adjacent ridges do not align. At the lowest point between connected shapes 904, a focal point 920 is formed where any water that has not been diverted to the gutter collects and is diverted through the filter media or travels up and over the narrow focal point 920 to flow further downward and hit the elevated ridge of connected shapes located beneath it.

Figure 9B:
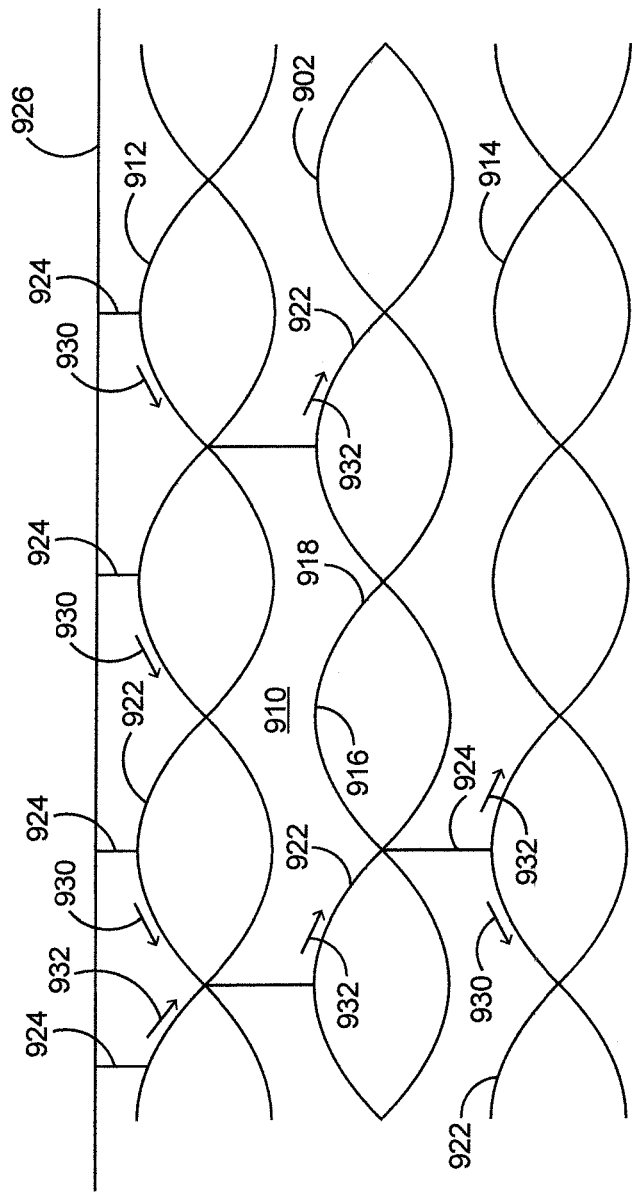
FIG. 9B is a closeup plan view of a section of wire mesh filtration screen of the third embodiment introduced in FIG. 9A, shown performing in a rainstorm.

Referring also to FIG. 9B, a section of the mesh filtration screen 910 from the embodiment 900 of FIG. 9A is shown. Each elevated ridge 912, 902, 914 presents a leading edge 922 toward the flow of any water 924 coming off of the roof to which the device is attached. When water contacts the first ridge 912 nearest the upper edge 926 of the screen 910 it is slowed down and diverts water left 930, right 932 or left and right, depending on where the water 924 contacts the first elevated ridge 912, the water being siphoned beneath the screen into a gutter to which the device 900 is attached. Water 924 travels along the leading edge from high points 916 to low points 918. Successive ridges 902, 914 after the first ridge 912 receive less and less water, until the flow is dissipated and siphoned into the gutter.

Figure 10:
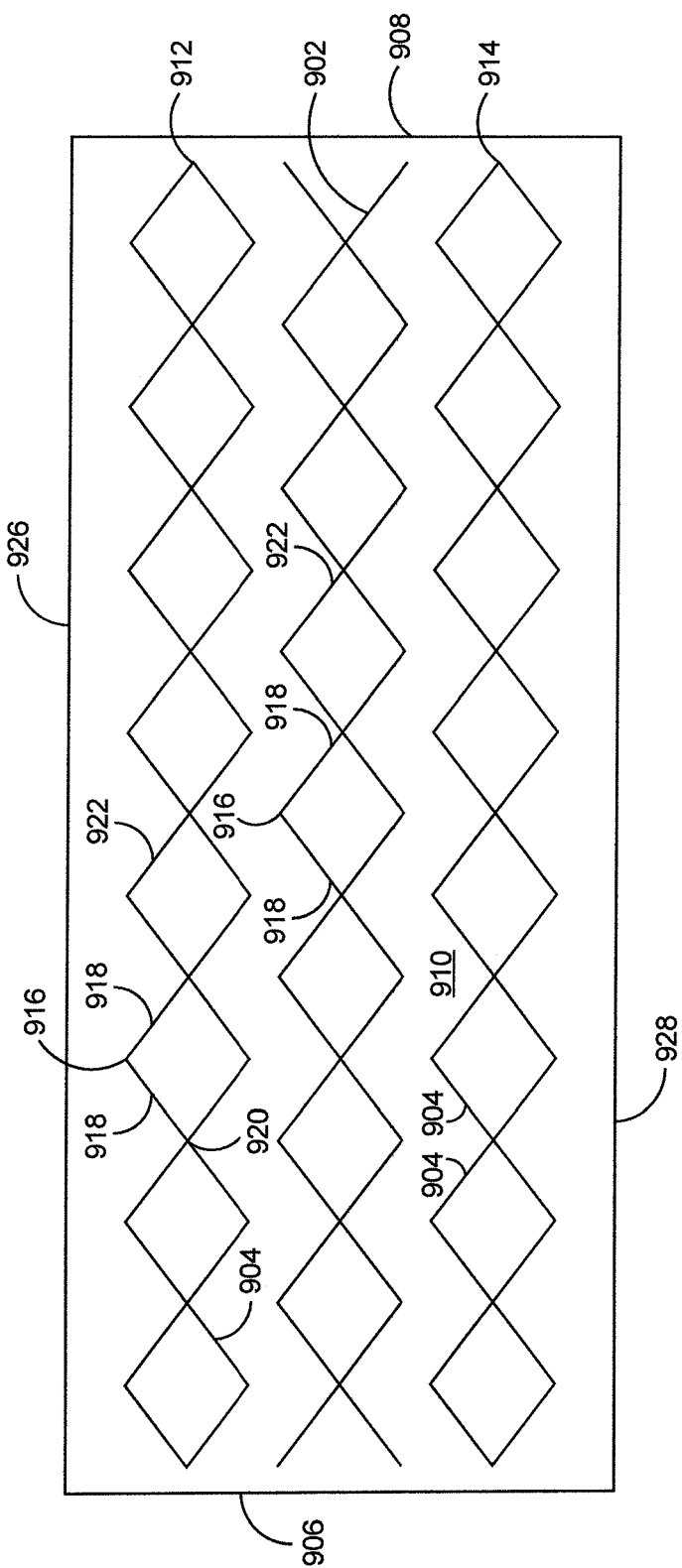
FIG. 10 is a plan view of a possible alternative third embodiment of the gutter guard system in accordance with the invention, which employs an elevated ridge pattern comprised of connected shapes which run between the left and right sides of the wire mesh filtration screen. In this embodiment, the elevated ridge pattern is comprised of connected diamond shapes.

FIG. 10 illustrates a plan view of another possible third embodiment filtration screen where elevated ridges 902 are organized into staggered relationships with adjacent elevated ridges 912, 914. As shown, elevated ridges 902, 912, 914 are comprised of connected diamond shapes 904 running between the left 906 and right 908 sides of the wire mesh filtration screen 910. The connected shapes 904 are connected to form elevated ridge 902 and adjacent horizontal elevated ridges 912, 914 are staggered such that the high 916 and low 918 points of adjacent ridges do not align. At the lowest point, a focal point 920 is formed where any water that has not been diverted to the gutter collects and is diverted through the filter media 910 or up and over the narrow focal point 920 to flow and hit the elevated ridge of connected shapes located beneath it. Each elevated ridge pattern presents a leading edge 922 toward the flow of any water coming off of the roof to which the device is attached. Water travels along the leading edge 922 from high points 916 to low points 918. First ridge 912 beneath the upper edge 926 received the most amount of water from a roof. Successive ridges 902, 914 after the first ridge 912 receive less and less water, until the flow is dissipated and siphoned into the gutter.

Figure 11:
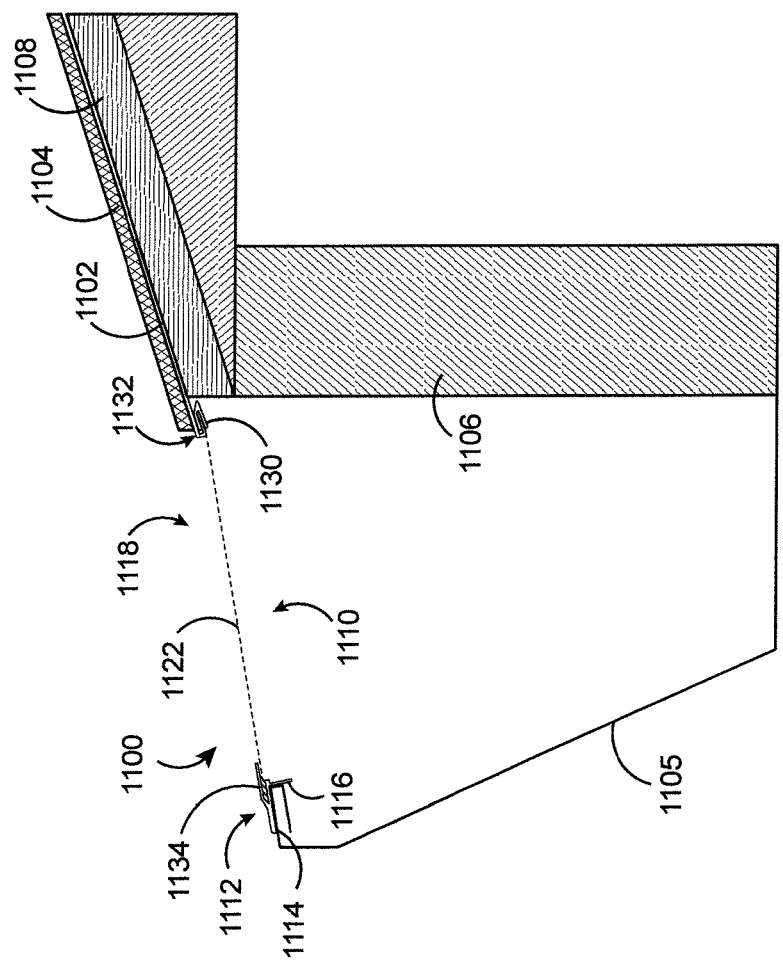
FIG. 11 is a side view of the gutter guard system showing the upper wing located beneath a first course of shingles on a roof.

FIG. 11 is a side view of the gutter guard system 1100 showing the upper wing 1102 located beneath a first course of shingles 1104 on a roof 1108. The gutter 1105 is shown attached to an eave 1106 of a building adjacent the roof 1108, with the gutter guard system 1100 spanning the gutter opening 1110. The front plane connection 1112 rests upon front lip 1114 of gutter 1105. A downward-depending stop plate 1116 extends beneath the front plane connection 1112 and abuts against the interior edge of the gutter front lip 1114. The mid-portion 1118 of the gutter guard system 1100 comprises the mesh filtration screen 1122. The upper wing 1102 is attached to the rear plane connection 1130 which incorporates a rear receiver 1132. The rear receiver 1132 can fit both the upper edge of the mesh filtration screen 1122 and the crimping portion of the upper wing 1102. Additionally, separate rear receivers for the mesh screen 1122 and the upper wing 1102 can be adapted as part of the rear plane connection 1130 as will be discussed further herein. The front plane connection 1112 is comprised of a front receiver 1134 for receiving and crimping the lower edge of the mesh filtration screen 1122 therein. The receivers 1132, 1134 are preferably formed of aluminum, in an open position, during the extrusion process. The upper wing 1102 is designed to be bendable so that it can accommodate a variety of roof pitch angles likely to be encountered in gutter guard applications.

Figure 12:
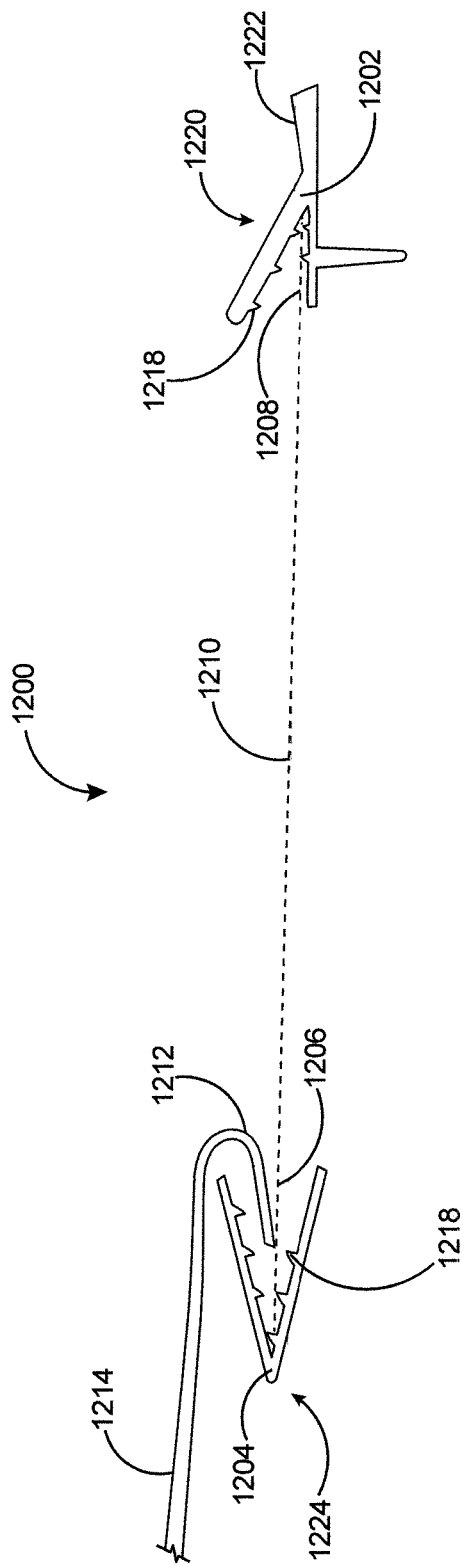
FIG. 12 is a closeup left end view of the receiver portions, the receivers for receiving the upper and lower edges of the mesh filtration screen as well as the attachment portion of the upper wing. The receivers are extruded in the open position, ready to receive the screen edges and the upper wing attachment portion.

FIG. 12 is a closeup end view of the gutter guard system 1200 showing the receivers 1204, 1202 receiving the upper 1206 and lower 1208 edges of the mesh filtration screen 1210 as well as the rear receiver 1204 receiving the attachment portion 1212 of the upper wing 1214. The receivers 1202, 1204 are extruded in the open position, as shown in this view, ready to receive the screen edges or the upper wing. Later, in the manufacturing process, the receivers 1202, 1204 are crimped shut upon the screen edges 1208, 1206 and attachment portion 1212 of the upper wing 1214 to hold these components fast. With the patterned mesh screens described herein, it is best to keep a portion of the screen edge pattern-free, that is, the edges 1208, 1206 should ideally be comprised of flat screen only to be inserted into the receivers 1204, 1202. Here, the mesh filtration screen 1210 is shown as a dotted line, without any individual elevated shapes, or elevated ridges, for the sake of simplicity. With the flat screen edges 1208, 1206 inserted, the receivers 1202, 1204 are crimped shut and a plurality of raised teeth 1218 within the receivers hold the screen 1210 or the upper wing 1214 in place. When the front receiver 1202 is crimped shut, it forms part of the front plane connection 1220, the front plane connection also having an extension 1222 for setting upon the front lip of a gutter. The rear receiver 1204 forms the entire rear plane connection 1224 and can receive both the upper edge 1206 of the mesh screen and the attachment portion 1212 of the upper wing 1214. Upper wing 1214 is preferably made from a relatively stiff, yet bendable material, such as thin aluminum or sheet metal to make a gutter guard system that can be custom fit to the pitch orientations of most, if not all roofs. Also, while a single rear receiver 1204 comprises rear plane connection 1224 in FIG. 12, other embodiments of the rear plane connection add an additional rear receiver, one being a mesh screen receiver and the other being the upper wing receiver, as will be further described herein.

FIG. 13 is a closeup view of an alternative embodiment of the rear plane connection 1300, which has two rear receivers 1302, 1304. In this embodiment, the rear receivers 1302, 1304 are oriented in the same direction. The first rear receiver 1302 is adapted to receive the upper edge 1306 of the wire mesh filtration screen 1308 and crimp it therein. The second rear receiver 1304, is adapted to receive the attachment portion 1312 of the upper wing 1314, wherein the attachment portion 1312 has a curved front edge so as to hook into the second rear receiver 1304 and be crimped therein.

FIG. 14 is a closeup view of a further alternative embodiment of the rear plane connection 1400, which has two rear receivers 1402, 1404 comprising the rear plane connection 1400. The rear plane connection has first 1402 and second 1404 rear receivers facing in opposite directions for receiving an attachment portion 1406 of the upper wing 1408 having a straight front edge for crimping in the second rear receiver 1404. The first rear receiver 1402 functions to receive the upper edge 1412 of a mesh filtration screen 1414.

The wire mesh filtration screen of the present invention employs horizontal rows of individual elevated shapes, elevated ridges and connected elevated shapes that are staggered relative to adjacent horizontal rows. Also, the horizontal rows employ individual elevated shapes, elevated ridges and connected elevated shapes with leading edges which are configured with high points graduating to low points to aid in diverting water from its normal path being perpendicular to the gutter. The leading edge slows the water down and creates a siphoning effect of water diverting into the gutter due to higher velocity water colliding with the water present along the leading edge. These principals are carried out with the embodiments illustrated herein.

The gutter guard system of the present invention precludes leaves and other debris from entering the gutter to which it is attached, while allowing water to pass into the gutter. The horizontal staggered rows of individual elevated shapes, elevated ridges and connected elevated shapes rise above the flat portions of the mesh filtration screen, a preferred vertical distance of ⅛" or less and serve to provide a water-facing leading edge onto which water contacts and slows down. The horizontal staggered rows of individual elevated shapes, elevated ridges and connected elevated shapes also serve to elevate leaves and debris, creating paths for airflow between the mesh filtration screen and the leaves and debris. This allows the leaves and debris to dry out faster and be carried off of the gutter guard system by wind, or easily cleaned by sweeping the mesh filtration screen, for example.

Finally, although the description above contains much specificity, this should not be construed as limiting the scope of the invention, but as merely providing illustrations of some of the presently preferred embodiments of this invention. This invention may be altered and rearranged in numerous ways by one skilled in the art without departing from the coverage of any patent claims, which are supported by this specification.

The invention claimed is:

1. A gutter guard system for keeping leaves and other debris out of a roof gutter while allowing water to pass into the gutter, the gutter guard system comprising:
  a filter media, the filter media for keeping leaves and debris from passing into a gutter to which the system is attached, the filter media further allowing water to pass into the gutter;
  the filter media further comprising a plurality of elevated horizontal rows having a plurality of leading edges, the leading edges being configured with high points declining to low points, the elevated horizontal rows with leading edges rising a vertical distance above adjacent flat portions of the filter media, the elevated horizontal rows extending between a left side and a right side of the filter media, wherein any selected elevated horizontal row is staggered relative to adjacent elevated horizontal rows located above or below the selected elevated horizontal row;
  wherein the leading edges provide water-diverting obstacles, the leading edges being oriented to stand against a flow of water over the filter media, each leading edge diverting water down each leading edge from the high point to the low point along each leading edge.

2. The gutter guard system as recited in claim 1, wherein the plurality of elevated horizontal rows is further comprised of individual elevated shapes, wherein each individual elevated shape presents a leading edge possessing a high point declining to a low point.

3. The gutter guard system as recited in claim 1, wherein the plurality of elevated horizontal rows is further comprised of elevated ridges, wherein each elevated ridge presents at least one leading edge possessing a high point declining to a low point.

4. The gutter guard system as recited in claim 3, wherein the horizontal rows of elevated ridges further comprise at least one focal point at which water collects and converges.

5. The gutter guard system as recited in claim 1, wherein the plurality of elevated horizontal rows is further comprised of elevated connected shapes, wherein each elevated connected shape presents at least one leading edge possessing a high point declining to a low point.

6. The gutter guard system as recited in claim 5, wherein the horizontal rows of elevated connected shapes further comprise at least one focal point at which water collects and converges.

7. The gutter guard system as recited in claim 1, wherein the filter media is a wire mesh filtration screen.

8. The gutter guard system as recited in claim 7, wherein the elevated horizontal rows are embossed into the wire mesh filtration screen.

9. A gutter guard system for keeping leaves and other debris out of a roof gutter while allowing water to pass into the gutter, the gutter guard system comprising:
 a filter media, the filter media for keeping leaves and debris from passing into a gutter to which the system is attached, the filter media further allowing water to pass into the gutter;
 the filter media further comprising a plurality of elevated horizontal rows having a plurality of leading edges, the leading edges being configured with high points declining to low points, the elevated horizontal rows with leading edges rising a vertical distance above adjacent flat portions of the filter media, the elevated horizontal rows extending between a left side and a right side of the filter media, wherein any selected elevated horizontal row is staggered relative to adjacent elevated horizontal rows located above or below the selected elevated horizontal row;
 wherein the leading edges provide water-diverting obstacles, the leading edges being oriented to stand against a flow of water over the filter media, each leading edge diverting water down each leading edge from the high point to the low point along each leading edge;
 a front connection plane, the front connection plane for connecting to a lower edge of the filter media;
 a rear connection plane, the rear connection plane for connecting to an upper edge of the filter media; and
 an upper wing for attaching to said rear connection plane, said upper wing being adapted for positioning beneath a course of shingles on a roof.

10. The gutter guard system as recited in claim 9, further comprising a first receiver at the front connection plane and a second receiver at the rear connection plane, the first receiver coupling the lower edge of the filter media and the second receiver coupling the upper edge of the filter media.

11. The gutter guard system as recited in claim 10, further comprising a third receiver at the rear connection plane, the third receiver coupling to the upper wing.

12. The gutter guard system as recited in claim 9, wherein the plurality of elevated horizontal rows is further comprised of individual elevated shapes, wherein each individual elevated shape presents a leading edge, the leading edge possessing a high point declining to a low point.

13. The gutter guard system as recited in claim 9, wherein the plurality of elevated horizontal rows is further comprised of elevated ridges, wherein each elevated ridge presents at least one leading edge, the at least one leading edge possessing a high point declining to a low point.

14. The gutter guard system as recited in claim 13, wherein the horizontal rows of elevated ridges further comprise at least one focal point at which water collects and converges.

15. The gutter guard system as recited in claim 9, wherein the plurality of elevated horizontal rows is further comprised of elevated connected shapes, wherein each elevated connected shape presents at least one leading edge, the at least one leading edge possessing a high point declining to a low point.

16. The gutter guard system as recited in claim 15, wherein the horizontal rows of elevated connected shapes further comprise at least one focal point at which water collects and converges.

17. The gutter guard system as recited in claim 9, wherein the filter media is a wire mesh filtration screen.

18. The gutter guard system as recited in claim 17, wherein the wire mesh filtration screen is of a 30-mesh size with an engineered diameter in a range of 0.011 to 0.016 inches.

19. The gutter guard system as recited in claim 17, wherein the elevated horizontal rows are embossed into the wire mesh filtration screen.

* * * * *